United States Patent
Teller et al.

(10) Patent No.: US 10,460,101 B2
(45) Date of Patent: Oct. 29, 2019

(54) ENRICHING NETFLOW DATA WITH PASSIVE DNS DATA FOR BOTNET DETECTION

(71) Applicant: Microsoft Technology Licensing, LLC, Redmond, WA (US)

(72) Inventors: Tomer Teller, Tel Aviv (IL); Roy Levin, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/615,002

(22) Filed: Jun. 6, 2017

(65) Prior Publication Data
US 2018/0349599 A1     Dec. 6, 2018

(51) Int. Cl.
| | |
|---|---|
| *H04L 29/06* | (2006.01) |
| *G06F 21/55* | (2013.01) |
| *H04L 29/08* | (2006.01) |
| *H04L 29/12* | (2006.01) |

(52) U.S. Cl.
CPC ........ *G06F 21/552* (2013.01); *H04L 61/1511* (2013.01); *H04L 63/0236* (2013.01); *H04L 63/1408* (2013.01); *H04L 63/1416* (2013.01); *H04L 63/1425* (2013.01); *H04L 63/1433* (2013.01); *H04L 67/02* (2013.01)

(58) Field of Classification Search
CPC ...... G06F 21/552; G06F 21/554; G06F 21/56; H04L 61/1511; H04L 63/0236; H04L 63/1408; H04L 63/1416; H04L 63/1425; H04L 63/1433; H04L 63/1411
USPC .................................................... 726/22–25
See application file for complete search history.

(56) References Cited

U.S. PATENT DOCUMENTS

| | | | | |
|---|---|---|---|---|
| 7,925,766 | B2 * | 4/2011 | Jayawardena | H04L 45/00 370/401 |
| 8,260,914 | B1 | 9/2012 | Ranjan | |
| 8,402,543 | B1 * | 3/2013 | Ranjan | H04L 63/1416 709/223 |
| 8,578,493 | B1 * | 11/2013 | Cowan | G06F 21/554 709/224 |
| 8,769,677 | B2 * | 7/2014 | Vashist | H04L 63/101 726/22 |
| 8,966,631 | B2 * | 2/2015 | El-Moussa | H04L 63/1425 709/223 |

(Continued)

OTHER PUBLICATIONS

Poll, et al., "Botnet Detection Using Passive DNS", In Master Thesis of Department of Computing Science Radboud University Nijmegen, 2013, 52 pages.
(Continued)

*Primary Examiner* — Hosuk Song
(74) *Attorney, Agent, or Firm* — Workman Nydegger

(57) ABSTRACT

In one example, a system includes a processor, memory, and a botnet detection application stored in memory and executed by the processor and configured to: obtain (i) Netflow data indicating one or more IP addresses accessed by a computer and (ii) passive Domain Name System (DNS) data indicating respective one or more domains associated with each of the one or more IP addresses; generate features associated with the computer based on the Netflow data and passive DNS data; generate probability data based on the Netflow data and passive DNS data, wherein the probability data indicates a probability that the computer accessed the one or more domains; assign weights to the features based on the probability data to provide weighted features; and determine whether the computer is likely to be part of a botnet based on the weighted features.

23 Claims, 6 Drawing Sheets

(56) References Cited

U.S. PATENT DOCUMENTS

| | | | |
|---|---|---|---|
| 9,032,521 B2* | 5/2015 | Amini | H04L 63/1433 |
| | | | 726/22 |
| 9,306,969 B2 | 4/2016 | Dagon et al. | |
| 9,363,282 B1* | 6/2016 | Yu | H04L 63/1425 |
| 9,398,028 B1 | 7/2016 | Karandikar et al. | |
| 9,430,646 B1 | 8/2016 | Mushtaq et al. | |
| 2010/0037314 A1 | 2/2010 | Perdisci et al. | |
| 2013/0191915 A1 | 7/2013 | Antonakakis et al. | |
| 2014/0013434 A1 | 1/2014 | Ranum et al. | |
| 2016/0099967 A1 | 4/2016 | Stemm et al. | |

OTHER PUBLICATIONS

Nguyen, et al., "DGA Botnet detection using Collaborative Filtering and Density-based Clustering", In Proceedings of the Sixth International Symposium on Information and Communication Technology, Dec. 3, 2015, pp. 203-209.

Bilge, et al., "Disclosure: Detecting Botnet Command and Control Servers Through Large-Scale NetFlow Analysis", Retrieved from: http://www.syssec-project.eu/m/page-media/3/bilge-acsac12.pdf, Dec. 3, 2012, 10 pages.

Levin, Roy, "Large-Scale Analysis of DNS Query Logs Reveals Botnets in the Cloud", Retrieved from: https://azure.microsoft.com/en-us/blog/large-scale-analysis-of-dns-query-logs-reveals-botnets-in-the-cloud/, Mar. 27, 2017, 7 pages.

"International Search Report and Written Opinion Issued in PCT Application No. PCT/US2018/034980", dated Aug. 29, 2018, 14 Pages.

* cited by examiner

ENRICHING NETFLOW DATA WITH PASSIVE DNS DATA FOR BOTNET DETECTION

FIELD

The present disclosure relates to systems and methods for detecting a Botnet using Netflow data and passive Domain Name System (DNS) data.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A Botnet is a group of machines (each individual machine referred to as a "bot") infected by malware and controlled by one or more Command and Control (CnC) servers, frequently unbeknownst to the machines' owners. The one or more CnC servers are used by a remote controller (referred to as a "botmaster" or "botherder") to issue commands to the bots. Typical applications of Botnets include Distributed Denial-of-Service (DDoS) attacks, identity theft, click fraud, spreading spam or viruses, etc.

Botnets are known to use the Domain Name System (DNS) for a multitude of purposes, including (i) managing communication between the bots and CnC and (ii) frustrating Botnet detection efforts. For example, with regard detection avoidance, Botnets routinely employ techniques for rapidly changing the DNS information associated with infected machines. Such techniques include rapidly changing IP addresses and/or domain names associated with infected machines. A few well-known, DNS-based techniques for avoiding Botnet detection include Fast-Flux and Domain Generation Algorithms (DGAs). Accordingly, enhanced systems and methods for identifying Botnets are desired.

SUMMARY

In a feature, a system is provided. The system may include a processor, memory, and a botnet detection application that is stored in the memory and executed by the processor. The botnet detection application may be configured to obtain (i) Netflow data indicating one or more IP addresses accessed by a computer and (ii) passive Domain Name System (DNS) data indicating respective one or more domains associated with each of the one or more IP addresses. The botnet detection application may generate features associated with the computer based on the Netflow data and the passive DNS data. Further, the botnet detection application may generate probability data based on the Netflow data and passive DNS data. The probability data may indicate a probability that the computer accessed the one or more domains. In addition, the botnet detection application may assign weights to the features based on the probability data to provide weighted features. Finally, the botnet detection application may determine whether the computer is likely to be part of a botnet based on the weighted features.

In another feature, the botnet detection application may be further configured to obtain domain registration data indicating a date of registration and/or a registrant associated with each of the one more domains. In one example of the foregoing feature, the botnet detection application may be further configured to generate the features based on the domain registration data.

In one feature, the botnet detection application is configured to determine whether the computer is likely to be part of the botnet by applying a supervised machine learning algorithm to the weighted features. In one example of this feature, applying the supervised machine learning algorithm may include training the supervised machine learning algorithm using historical data and known labels associated with a plurality of different computers.

In a feature, the features may include one or more of the following: an indication that the computer has accessed rare IP addresses or domains; an indication that the computer has accessed domains having less than or equal to a predetermined age; an indication that the computer has received a number of NX domain responses to DNS queries exceeding a predetermined threshold; an indication that the computer has accessed a number of IP addresses or domains for the first time exceeding a predetermined threshold; and/or an indication that the computer has accessed an IP address or domain associated with an idiosyncratic score exceeding a predetermined threshold.

In another feature, the botnet detection application may be configured to determine whether the computer is likely to be part of the botnet by comparing the weighted features with corresponding features associated with a plurality of different computers known to be part of a botnet.

In one feature, the botnet detection application may be configured to obtain the Netflow data from one or more routers.

In yet another feature, the botnet detection application may be configured to obtain the passive DNS data from one or more DNS servers.

In one feature, the computer comprises a virtual machine.

In a feature, a method is provided. The method may include obtaining, from one or more routers, Netflow data indicating one or more IP addresses accessed by a computer. Passive DNS data may be obtained from one or more Domain Name System (DNS) servers. The passive DNS data may indicate respective one or more domains associated with each of the one or more IP addresses. Features associated with the computer may be generated based on the Netflow data and passive DNS data. In addition, probability data may be generated based on the Netflow data and passive DNS data. The probability data may indicate a probability that the computer accessed the one or more domains. Weights may be assigned to the features based on the probability data to provide weighted features. A supervised machine learning algorithm may be trained using historical data and known labels associated with a plurality of different computers. Finally, the method may include determining whether the computer is likely to be part of a botnet by applying the supervised machine learning algorithm to the weighted features.

In one feature, the method further includes obtaining domain registration data indicting a date of registration and/or a registrant associated with each of the one or more domains. In one example of the foregoing feature, generating the features is further based on the domain registration data.

In another feature of the method, the features may include one or more of the following: an indication that the computer has accessed rare IP addresses or domains; an indication that the computer has accessed domains having less than or equal to a predetermined age; an indication that the computer has received a number of NX domain responses to DNS queries exceeding a predetermined threshold; an indication that the computer has accessed a number of IP addresses or domains for the first time exceeding a predetermined threshold; and/or an indication that the computer has accessed an IP address or domain associated with an idiosyncratic score exceeding a predetermined threshold.

In one feature of the method, the computer includes a virtual machine

In a feature, a system is provided. The system may include a processor, memory, and a botnet detection application that is stored in the memory and executed by the processor. The botnet detection application may be configured to obtain, from one or more routers, Netflow data indicating one or more IP addresses accessed by a computer. In addition, the botnet detection application may be configured to obtain, from one or more Domain Name System (DNS) servers, passive DNS data indicating respective one or more domains associated with each of the one or more IP addresses. The botnet detection application may generate features associated with the computer based on the Netflow data and the passive DNS data. Further, the botnet detection application may generate probability data based on the Netflow data and passive DNS data. The probability data may indicate a probability that the computer accessed the one or more domains. In addition, the botnet detection application may assign weights to the features based on the probability data to provide weighted features. Further, the botnet detection application may train a supervised machine learning algorithm using historical data and known labels associated with a plurality of different computers. Finally, the botnet detection application may determine whether the computer is likely to be part of a botnet by applying the supervised machine learning algorithm to the weighted features.

In another feature, the botnet detection application may be further configured to obtain domain registration data indicting at least one of a date of registration and a registrant associated with each of the one or more domains. In one example of the foregoing feature, the botnet detection application may be further configured to generate the features based on the domain registration data.

In one feature, the features may include one or more of the following: an indication that the computer has accessed rare IP addresses or domains; an indication that the computer has accessed domains having less than or equal to a predetermined age; an indication that the computer has received a number of NX domain responses to DNS queries exceeding a predetermined threshold; an indication that the computer has accessed a number of IP addresses or domains for the first time exceeding a predetermined threshold; and/or an indication that the computer has accessed an IP address or domain associated with an idiosyncratic score exceeding a predetermined threshold.

In another feature, the computer may include a virtual machine.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 1:
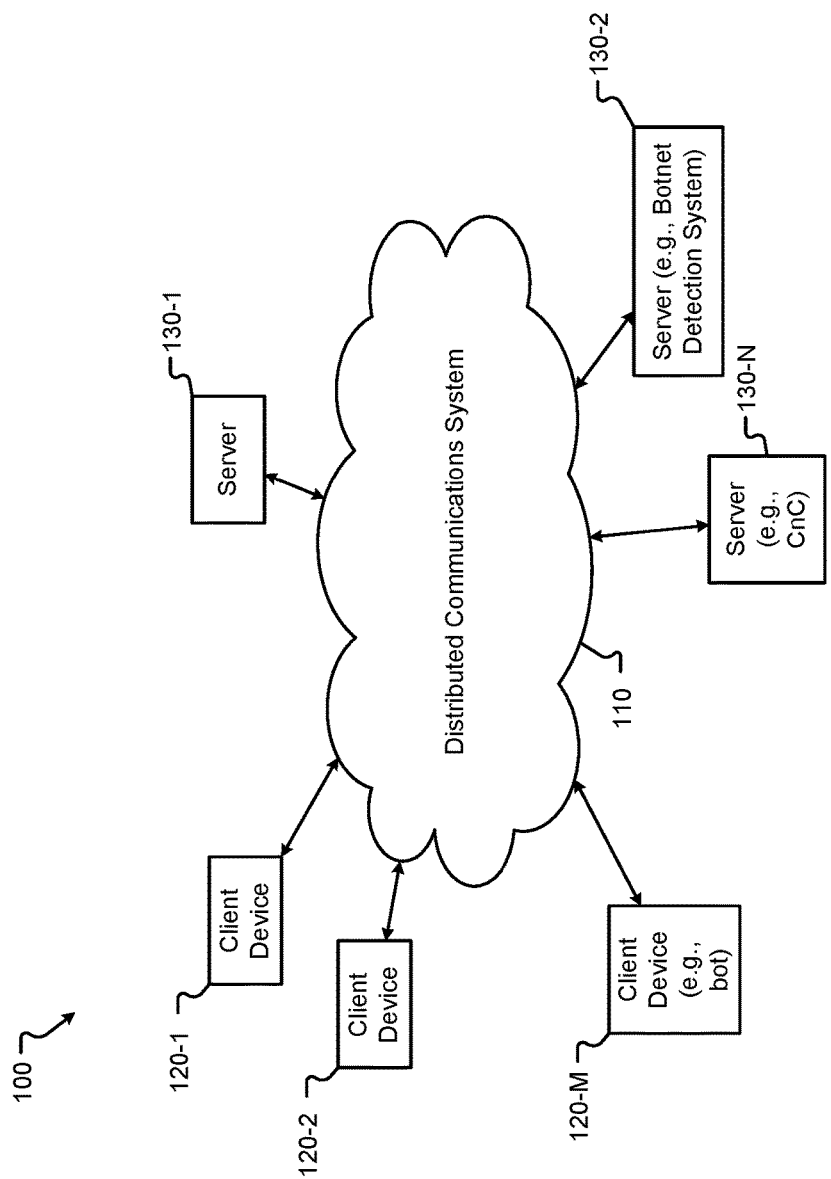
FIG. 1 is a functional block diagram of an example distributed computing system according to principles of the present disclosure.

FIG. 1 shows a simplified example of a distributed computing system 100. The distributed computing system 100 includes a distributed communications system 110, one or more client devices 120-1, 120-2, . . . , and 120-M (collectively, client devices 120), and one or more servers 130-1, 130-2, . . . , and 130-M (collectively, servers 130). N and M are integers greater than or equal to one. The distributed communications system 110 may include a local area network (LAN), a wide area network (WAN) such as the Internet, or other type of network. For example, the servers 130 may be located at different geographical locations. The client devices 120 and the servers 130 communicate with each other via the distributed communications system 110. The client devices 120 and the servers 130 connect to the distributed communications system 110 using wireless and/or wired connections.

The client devices 120 may include virtual machines, smartphones, personal digital assistants (PDAs), laptop computers, personal computers (PCs), etc. The servers 130 may provide multiple services to the client devices 120. For example, the servers 130 may execute software applications developed by one or more vendors. The server 130 may host multiple databases that are relied on by the software applications in providing services to users of the client devices 120.

In one example, the client device 120-M and server 130-N may constitute a simplified Botnet whereby the client device 120-M constitutes a bot and the server 130-N constitutes a CnC controlling the bot. While only a single bot and single CnC are shown in the system 100 of FIG. 1, those having ordinary skill will recognize that the Botnet may include additional bots and/or CnCs without deviating from the teachings herein. In one example, the server 130-2 may be configured to execute an application to perform Botnet detection using the methods disclosed herein.

Figure 2:
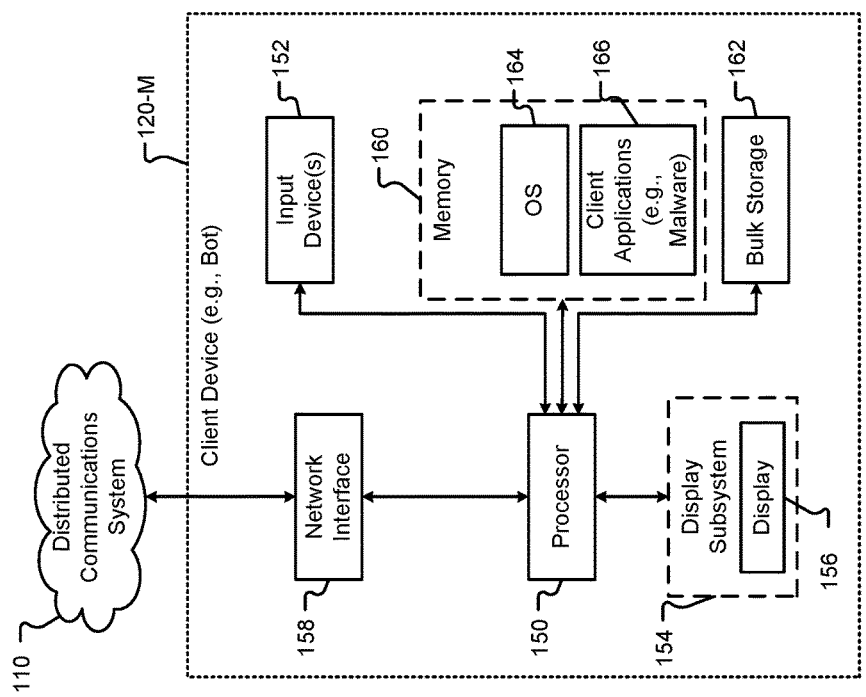
FIG. 2 is a functional block diagram of an example client device according to principles of the present disclosure.

FIG. 2 shows a simplified example of the client device 120-M. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-M to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-M executes an operating system (OS) 164 and one or more client applications 166. The client applications 166 include an application that accesses the servers 130 via the distributed communications system 110.

In one example, the client device 120-M may constitute a Bot included as part of a Botnet and under the control of a CnC. In such an example, the client applications 166 may include malware placing the client device 120-M under the control of a CnC.

Figure 3:
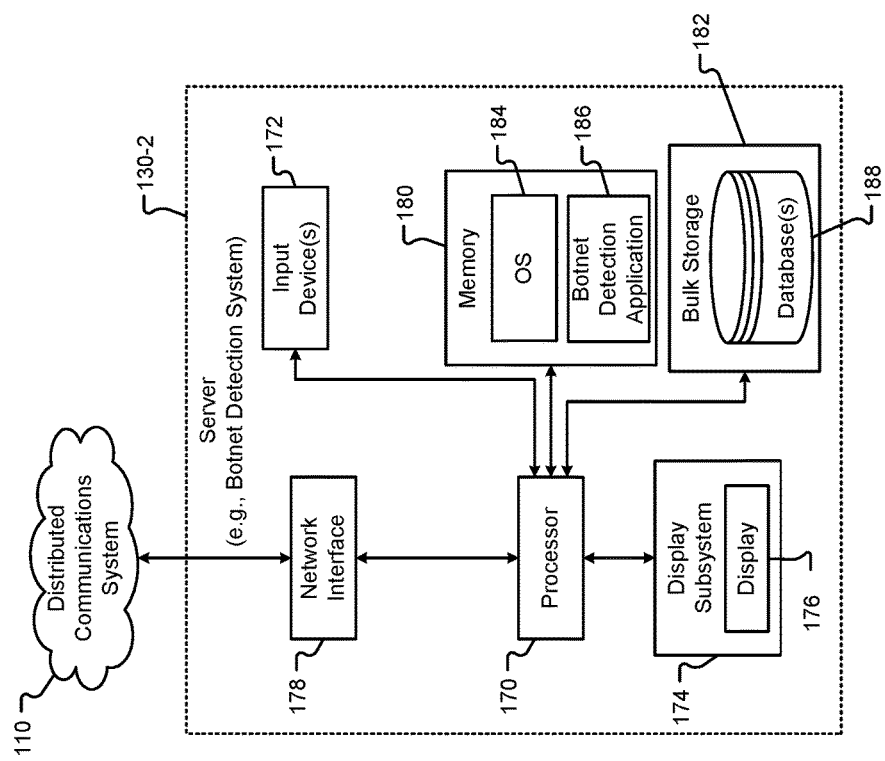
FIG. 3 is a functional block diagram of an example server according to principles of the present disclosure.

FIG. 3 shows a simplified example of the server 130-2. In one example, the server 130-2 may constitute a Botnet detection system configured to detect a computer included as part of a Botnet. The server 130-2 typically includes one or more CPUs or processors 170, a network interface 178, memory 180, and bulk storage 182. In some implementations, the server 130-2 may be a general-purpose server and include one or more input devices 172 (e.g., a keypad, touchpad, mouse, and so on) and a display subsystem 174 including a display 176.

The network interface 178 connects the server 130-2 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-2 executes an operating system (OS) 184 and one or more server applications, including a Botnet detection application 186, which may be housed in a virtual machine hypervisor or containerized architecture. The bulk storage 182 may store one or more databases 188 that store data structures used by the server applications (e.g., the Botnet detection application 186) to perform respective functions.

Figure 4:
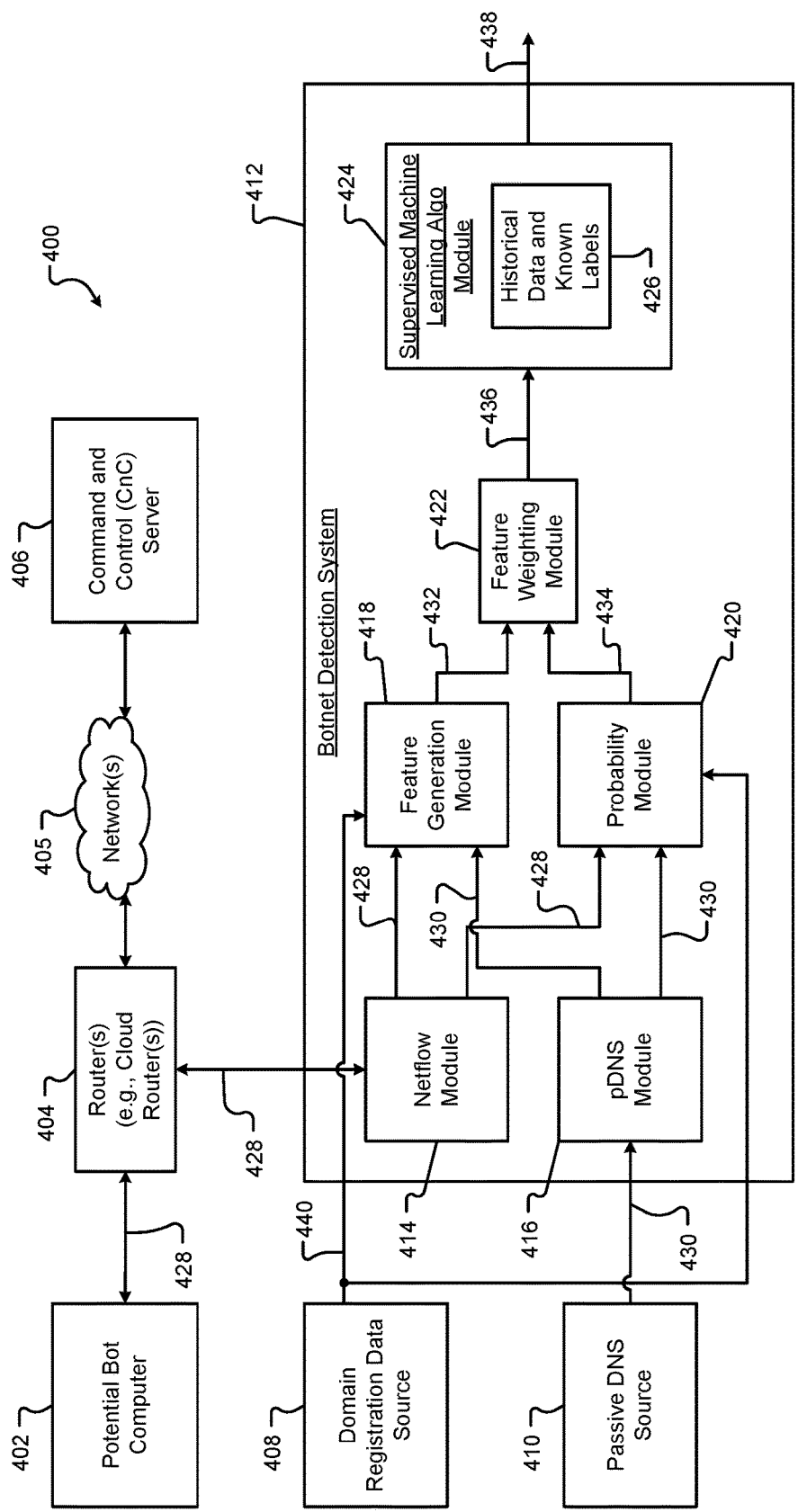
FIG. 4 is a functional block diagram of an example system including a potential Botnet according to principles of the present disclosure.

Turning now to FIG. 4, a system 400 including a potential Botnet is provided. The system 400 includes a potential bot computer 402, one or more routers 404, a CnC Server 406, a domain registration data source 408, a passive DNS data source 410, and a Botnet detection system 412. The various components of system 400 may be connected directly, or indirectly, via one or more wired or wireless networks.

The potential bot computer 402 may constitute a computer under examination by the Botnet detection system 412 to determine if it is part of a Botnet. In one example, the potential bot computer 402 may include a virtual machine hosted in a cloud computing environment. In another example, the potential bot computer 402 may constitute a server computer. In some examples, the potential bot computer 402 may be in communication with (and potentially under the control of) the CnC server 406 via one or more routers 404 and one or more networks 405. In one example, the router(s) 404 include router(s) utilized by a cloud provider. In addition, in some examples, the CnC server 406 may be connected (directly or indirectly) to additional routers that are external to any routers utilized by the cloud provider. Furthermore, although shown as separate from the Botnet Detection System 412, in some examples, the router(s) 404 may be incorporated as part of the Botnet Detection System 412 (e.g., in a scenario where the Botnet Detection System 412 and router(s) are implemented as part of a cloud environment).

The CnC server 406 may include a server under the control of a Botmaster through the infection of malware or the like. The Botmaster may employ the CnC server 406 as a proxy to exert control over any bots included as part of the Botnet.

The domain registration data source 408 may include any suitable source of information concerning the registrant and date of registration for one or more domains. In some examples, the domain registration data source 408 may include a data store or the like that stores registrant and registration date information for one or more domains. In another example, the domain registration data source 408 may include a website, such as WHOIS.com, that includes registrant and registration date information for one or more domains.

The passive DNS data source 410 may include any suitable source or sources of passive DNS data 430, such as a passive DNS database or one or more DNS servers. Passive DNS is a replication technique that passively captures DNS messages and allows for the storage of such data. In one example, the passive DNS data source 410 includes a database storing historical DNS data that is populated by passively listening to DNS queries and responses. The passive DNS data 430 may be utilized to gain insights that are important to Botnet detection, such as a list of all IP addresses that a domain name ever resolved in its lifetime.

The Botnet detection system 412 includes a netflow module 414, a passive DNS (pDNS) module 416, a feature generation module 418, a probability module 420, a feature weighting module 422, and a supervised machine learning algorithm module 424. In some examples, the Botnet detection system 412 may be implemented as server computer or the like (e.g., server 130-2 of FIG. 3) executing a Botnet detection application (e.g., Botnet detection application 186 of FIG. 3).

In operation, the system 400 may function as follows. The Netflow module 414 of the Botnet detection system 412 is configured to obtain (i.e., fetch or receive) Netflow data 428 from the one or more routers 404. The Netflow data 428 may indicate one or more IP addresses accessed by the potential bot computer 402. More specifically, the Netflow data 428 may include information about source and destination IP addresses, ports, packet size, etc. In some examples, the Netflow data 428 alone may be sufficient to identify specific IPs and ports that belong to a CnC server, thus exposing a Botnet. However, in other examples, and as discussed below, the Netflow data 428 alone may be insufficient to expose a Botnet. Accordingly, in such examples, additional types of data may be required to perform accurate Botnet detection.

The pDNS module 416 of the Botnet detection system 412 is configured to obtain passive DNS data 430 indicating, among other things, one or more domains associated with each of the one or more IP addresses accessed by the potential bot computer 402. More specifically, the passive DNS data 430 may include a log of mappings from domains to IPs at certain time intervals as provided, for example, by DNS servers. In some examples, the Botnet detection system 412 is configured to use the passive DNS data 430 to perform a reverse mapping from IPs to domains, at given times. However, such a mapping is not necessarily deterministic as oftentimes a single IP can be mapped to multiple domains at any time interval. Accordingly, and as discussed below, the probability module 420 may be utilized to produce a probabilistic map of domain access associated with the potential bot computer 402.

The feature generation module 418 of the Botnet detection system 412 is configured to generate features 432 associated with the potential bot computer 402 based on at least the Netflow data 428 and the passive DNS data 430. In one example, the feature generation module 418 is further configured to obtain domain registration data 440 from the domain registration data source 408 and generate the features 432 based additionally on the domain registration data 440. As noted above, the domain registration data 440 may include data concerning the registrant and date of registration associated with each domain of one or more domains accessed (or potentially accessed) by the potential bot computer 402.

The features 432 include one or more indications that influence the ultimate determination as to whether the potential bot computer 402 is likely to be part of a botnet or not. Such features 432 may include, but are not limited to: (i) an indication that the computer 402 has accessed rare IP addresses or domains; (ii) an indication that the computer 402 has accessed domains having less than or equal to a predetermined age; (iii) an indication that the computer 402 has received a number of NX domain responses (i.e., DNS responses indicating that the queried domain does not exist) to DNS queries exceeding a predetermined threshold; (iv) an indication that the computer 402 has accessed a number of IP addresses or domains for the first time exceeding a predetermined threshold; and/or (v) an indication that the computer 402 has accessed an IP address or domain associated with an idiosyncratic score exceeding a predetermined threshold.

With regard to indication (v) above, according to some examples, the feature generation module 418 may be configured to calculate an idiosyncratic score for IPs/domains accessed, or potentially accessed, by the computer 402, and determine whether the calculated idiosyncratic score exceeds a predetermined threshold. According to this example, the idiosyncratic score may be calculated as follows.

Traffic on all nodes of a distributed computing system may be analyzed and for each IP/domain, and a probability distribution q(x) may be computed. Further, traffic on all nodes of the distributed computing system labeled as "Botnet" (i.e., known Botnet nodes) are examined and, for each IP/domain, a probability distribution p(x) is calculated. Then, for each computer under examination (e.g., for a plurality of virtual machines in a cloud computing environment), the idiosyncratic scores of IP/Domains accessed are summed, where the idiosyncratic score is defined as:

$$p(x) * \log\left(\frac{p(x)}{q(x)}\right) \quad (1)$$

Those having ordinary skill will appreciate that the foregoing technique for calculating idiosyncratic scores is similar to Kullback-Leibler (KL) Divergence.

The probability module 422 of the Botnet detection system 412 is configured to generate probability data 434 based on at least the Netflow data 428 and passive DNS data 430. The probability data 434 indicates a probability that the computer 402 accessed the one or more domains indicated by the passive DNS data 430. More specifically, the probability data 434 may, in some examples, constitute a probabilistic map of domain access associated with the computer 402.

In one example, the probability module 422 is further configured to obtain domain registration data 440 from the domain registration data source 408 and generate the probability data 434 based additionally on the domain registration data 440. Furthermore, in one example, the probability module 422 is configured to generate the probability data 434 based on count data, which may be extracted from the Netflow data 428 and/or passive DNS data 430. The count data may indicate, for example, the number of times a given domain may be mapped to a given IP for all servers that provided a response at a particular time.

The feature weighting module 422 of the Botnet detection system 412 is configured to assign weights to the features 432 based on the probability data 434 to provide weighted features 436. More specifically, the feature weighting module 422 assigns weights to particular features based on the probability that the feature information (i.e., the various indications discussed above) is accurate—as measured by the probability data 434.

The supervised machine learning algorithm module 424 is configured to determine whether the computer 402 is likely to be part of a Botnet based on the weighted features 436. More specifically, the supervised machine learning algorithm module 424 is configured to correlate the weighted features 436 to one of two different labels applicable to the computer 402 under examination: (1) likely to be part of a Botnet or (2) not likely to be part of a Botnet. In one example, the correlation is accomplished by assigning a Botnet score to the computer 402 and assessing whether the computer's Botnet score is greater than or equal to a predetermined threshold. If the computer's Botnet score is greater than or equal to the predetermined threshold, label data 438 may be generated indicating that the computer 402 is likely to be part of a Botnet. If, on the other hand, the computer's Botnet score is less than the predetermined threshold, label data 438 may be generated indicating that the computer 402 is not likely to be part of a Botnet.

In one example, the supervised machine learning algorithm module 424 is configured to determine whether the computer 402 is likely to be part of a Botnet by applying a supervised machine learning algorithm to the weighted features 436. Any suitable supervised machine learning algorithm may be applied without deviating from the teachings herein including, but not limited to, Gradient Boosted Trees, k-Nearest Neighbors (kNN), Decision Tree Classifiers and Random Forests, Naïve Bayes, and/or Support Vector Machines.

According to some examples, the supervised machine learning algorithm module 424 is trained using historical data and known labels 426 before being applied to the weighted features 436 associated with the potential bot computer 402.

More specifically, the supervised machine learning algorithm module 424 may be trained by extracting feature sets associated with computers having known labels, i.e., computers either (i) known to be part of a Botnet (one type of label) or (ii) known to not be part of a Botnet (the other type of label). In this way, the supervised machine learning algorithm module 424 may regressively improve its Botnet detection accuracy as more features associated with known labels are analyzed. Stated differently, according to some examples, the supervised machine learning algorithm module 424 may be configured to determine whether the computer 402 is likely to be part of a Botnet by comparing the weighted features 436 with corresponding features associated with different computers known to be part of a Botnet (as reflected by the historical data and known labels 426).

Figure 5:
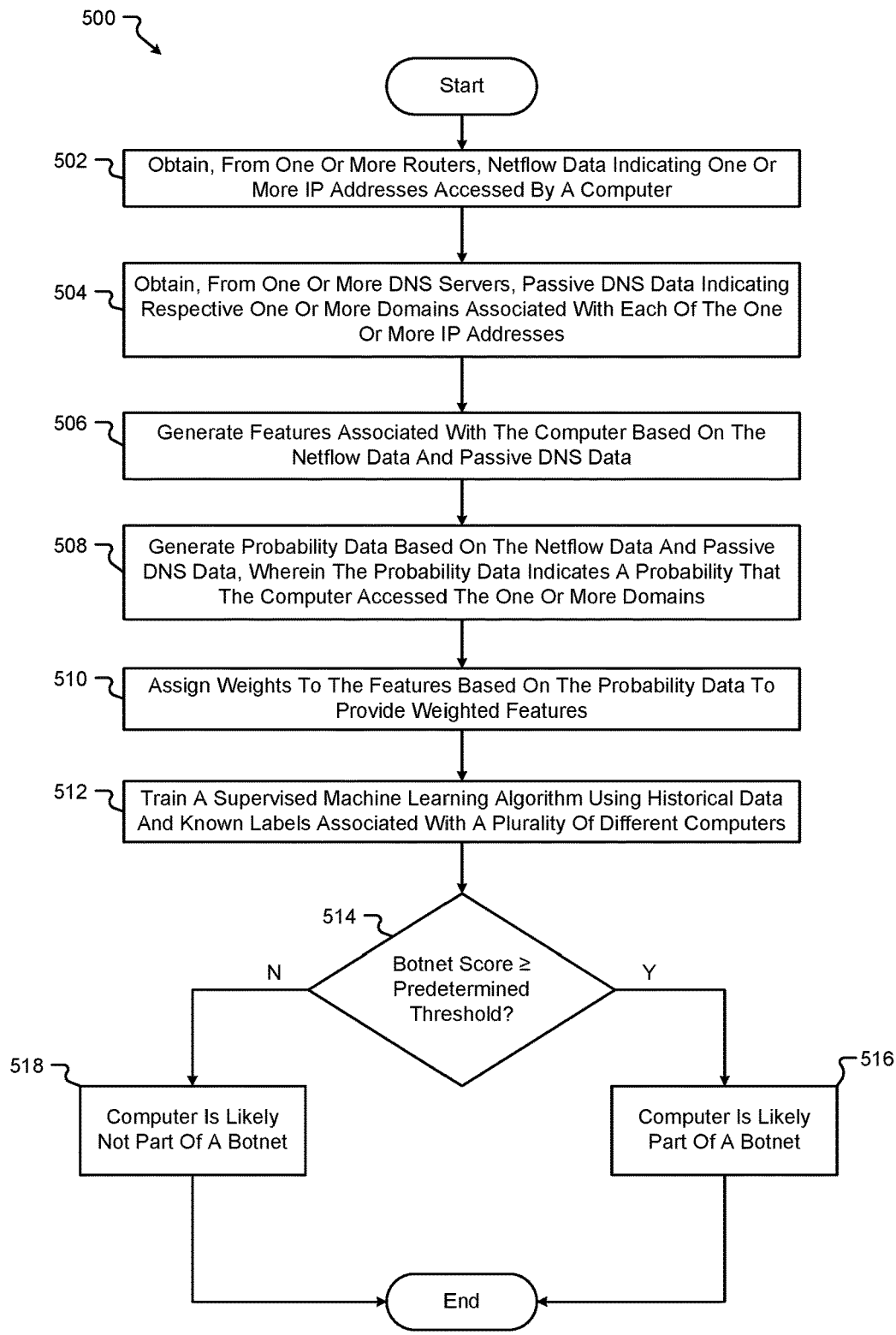
FIG. 5 is a flow diagram illustrating an example method for detecting a Botnet according to principles of the present disclosure.

Referring now to FIG. 5, a method 500 for detecting a Botnet is provided. The method 500 begins at 502 where Netflow data is obtained from one or more routers. The Netflow data indicates one or more IP addresses accessed by a computer. At 504, passive DNS data is obtained from one or more DNS servers. The passive DNS data indicates respective one or more domains associated with each of the one or more IP addresses. At 506, features associated with the computer are generated based on the Netflow data and passive DNS data. At 508, probability data is generated based on the Netflow data and the passive DNS data. The probability data indicates a probability that the computer accessed the one or more domains.

Continuing, at 510, weights are assigned to the features based on the probability data to provide weighted features. At 512, a supervised machine learning algorithm is trained using historical data and known labels associated with a plurality of different computers (i.e., computers that are different than the computer that is being examined as a potential Botnet computer).

At 514, a Botnet score is calculated for the computer by applying a supervised machine learning algorithm to the weighted features and a determination is made as to whether the calculated Botnet score is greater than or equal to a predetermined threshold. If so, the method 500 progresses to 516 where the computer is determined to likely be part of a Botnet and the method concludes. If the computer's calculated Botnet score is less than the predetermined threshold, the method proceeds to 518 and the computer is determined to not likely be part of a Botnet and the method concludes.

Figure 6:
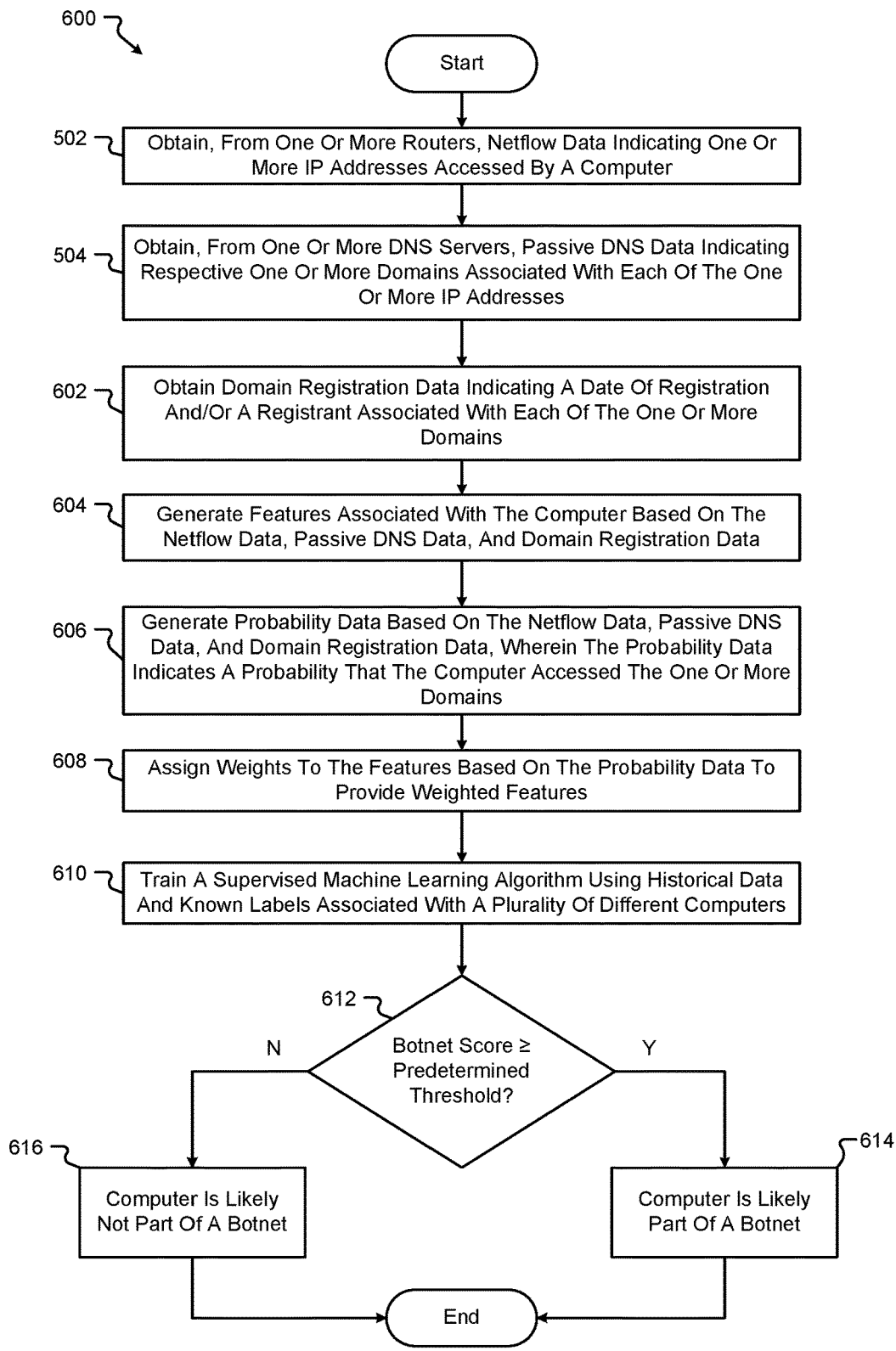
FIG. 6 is a flow diagram illustrating another example method for detecting a Botnet according to principles of the present disclosure.

Referring now to FIG. 6, another method 600 for detecting a Botnet is provided. Steps 502 and 504 of the method 600 proceed in accordance with the method 500 of FIG. 5. At 602, domain registration data is obtained. The domain registration data indicates a date of registration and/or a registrant associated with each of the one or more domains. At 604, features associated with the computer are generated based on the Netflow data, passive DNS data, and domain registration data.

At 606, probability data is generated based on the Netflow data, passive DNS data, and domain registration data. The probability data indicates a probability that the computer accessed the one or more domains. At 608, weights are assigned to the features based on the probability data to provide weighted features. At 610, a supervised machine learning algorithm is trained using historical data and known labels associated with a plurality of different computers.

At 612, a Botnet score is calculated for the computer by applying a supervised machine learning algorithm to the weighted features and a determination is made as to whether the calculated Botnet score is greater than or equal to a predetermined threshold. If so, the method 600 progresses to 614 where the computer is determined to likely be part of a Botnet and the method concludes. If the computer's calculated Botnet score is less than the predetermined threshold, the method proceeds to 616 and the computer is determined to not likely be part of a Botnet and the method concludes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A system comprising:
 a processor;
 memory; and
 a botnet detection application that is stored in the memory and executed by the processor and that is configured to:
  obtain Netflow data indicating one or more IP addresses accessed by a computer;
  obtain passive Domain Name System (DNS) data indicating respective one or more domains associated with each of the one or more IP addresses;
  generate features associated with the computer based on the Netflow data and passive DNS data;
  generate probability data based on the Netflow data and passive DNS data, wherein the probability data indicates a probability that the computer accessed the one or more domains, and wherein, in one or more instances, the probability is determined using a computed probability distribution over the one or more IP addresses and/or the one or more domains;
  assign weights to the features based on the probability data to provide weighted features; and
  determine whether the computer is likely to be part of a botnet based on the weighted features.

2. The system of claim 1, wherein the botnet detection application is further configured to obtain domain registration data indicating at least one of a date of registration and a registrant associated with each of the one more domains.

3. The system of claim 2, wherein the botnet detection application is further configured to generate the features based on the domain registration data.

4. The system of claim 1, wherein the botnet detection application is configured to determine whether the computer is likely to be part of the botnet by applying a supervised machine learning algorithm to the weighted features.

5. The system of claim 4, wherein applying the supervised machine learning algorithm comprises training the supervised machine learning algorithm using historical data and known labels associated with a plurality of different computers.

6. The system of claim 1, wherein the features include one or more of:
 an indication that the computer has accessed rare IP addresses or domains;
 an indication that the computer has accessed domains having less than or equal to a predetermined age;
 an indication that the computer has received a number of NX domain responses to DNS queries exceeding a predetermined threshold;
 an indication that the computer has accessed a number of IP addresses or domains for the first time exceeding a predetermined threshold; and
 an indication that the computer has accessed an IP address or domain associated with an idiosyncratic score exceeding a predetermined threshold.

7. The system of claim 1, wherein the botnet detection application is configured to determine whether the computer is likely to be part of the botnet by comparing the weighted features with corresponding features associated with a plurality of different computers known to be part of a botnet.

8. The system of claim 1, wherein the botnet detection application is configured to obtain the Netflow data from one or more routers.

9. The system of claim 1, wherein the botnet detection application is configured to obtain the passive DNS data from one or more DNS servers.

10. The system of claim 1, wherein the computer comprises a virtual machine.

11. The system of claim 1, wherein the features include an indication that the computer has accessed rare IP addresses or domains.

12. The system of claim 1, wherein the features include an indication that the computer has accessed domains having less than or equal to a predetermined age.

13. The system of claim 1, wherein the features include an indication that the computer has received a number of NX domain responses to DNS queries exceeding a predetermined threshold.

14. The system of claim 1, wherein the features include an indication that the computer has accessed a number of IP addresses or domains for a first time exceeding a predetermined threshold.

15. The system of claim 1, wherein the features include an indication that the computer has accessed an IP address or domain associated with an idiosyncratic score exceeding a predetermined threshold.

16. A method comprising:
obtaining, from one or more routers, Netflow data indicating one or more IP addresses accessed by a computer;
obtaining, from one or more Domain Name System (DNS) servers, passive DNS data indicating respective one or more domains associated with each of the one or more IP addresses;
generating features associated with the computer based on the Netflow data and passive DNS data, wherein the features include one or more of:
an indication that the computer has accessed rare IP addresses or domains;
an indication that the computer has accessed domains having less than or equal to a predetermined age;
an indication that the computer has received a number of NX domain responses to DNS queries exceeding a predetermined threshold;
an indication that the computer has accessed a number of IP addresses or domains for a first time exceeding a predetermined threshold; or
an indication that the computer has accessed an IP address or domain associated with an idiosyncratic score exceeding a predetermined threshold;
generating probability data based on the Netflow data and passive DNS data, wherein the probability data indicates a probability that the computer accessed the one or more domains;
assigning weights to the features based on the probability data to provide weighted features;
training a supervised machine learning algorithm using historical data and known labels associated with a plurality of different computers; and
determining whether the computer is likely to be part of a botnet by applying the supervised machine learning algorithm to the weighted features.

17. The method of claim 16, further comprising:
obtaining domain registration data indicting at least one of a date of registration and a registrant associated with each of the one or more domains.

18. The method of claim 17, wherein generating the features is further based on the domain registration data.

19. The method of claim 16, wherein the computer comprises a virtual machine.

20. A system comprising:
a processor;
memory;
a botnet detection application that is stored in the memory and executed by the processor and that is configured to:
obtain, from one or more routers, Netflow data indicating one or more IP addresses accessed by a computer;
obtain, from one or more Domain Name System (DNS) servers, passive DNS data indicating respective one or more domains associated with each of the one or more IP addresses;
generate features associated with the computer based on the Netflow data and passive DNS data, wherein the features include one or more of:
an indication that the computer has accessed rare IP addresses or domains;
an indication that the computer has accessed domains having less than or equal to a predetermined age;
an indication that the computer has received a number of NX domain responses to DNS queries exceeding a predetermined threshold;
an indication that the computer has accessed a number of IP addresses or domains for a first time exceeding a predetermined threshold; or
an indication that the computer has accessed an IP address or domain associated with an idiosyncratic score exceeding a predetermined threshold;
generate probability data based on the Netflow data and passive DNS data, wherein the probability data indicates a probability that the computer accessed the one or more domains;
assign weights to the features based on the probability data to provide weighted features;
train a supervised machine learning algorithm using historical data and known labels associated with a plurality of different computers; and
determine whether the computer is likely to be part of a botnet by applying the supervised machine learning algorithm to the weighted features.

21. The system of claim 20, wherein the botnet detection application is further configured to obtain domain registration data indicting at least one of a date of registration and a registrant associated with each of the one or more domains.

22. The system of claim 21, wherein the botnet detection application is further configured to generate the features based on the domain registration data.

23. The system of claim 20, wherein the computer comprises a virtual machine.

* * * * *